April 26, 1966 E. KLEIN ETAL 3,248,211
REFINING OF IRON
Filed Sept. 18, 1964 2 Sheets-Sheet 1

Elias Klein,
Kurt Otto Reinhold Gebhard
INVENTORS

BY Irwin S. Thompson

ATTORNEY

April 26, 1966     E. KLEIN ETAL     3,248,211

REFINING OF IRON

Filed Sept. 18, 1964     2 Sheets-Sheet 2

Elias Klein,
Kurt Otto Reinhold Gebhard
INVENTORS

BY

ATTORNEY

United States Patent Office 3,248,211
Patented Apr. 26, 1966

3,248,211
REFINING OF IRON
Elias Klein and Kurt O. R. Gebhard, Brooklyn, Pretoria, Transvaal, Republic of South Africa, assignors to South African Iron and Steel Industrial Corporation Limited, Pretoria, Transvaal, Republic of South Africa
Filed Sept. 18, 1964, Ser. No. 397,375
5 Claims. (Cl. 75—60)

This application is a continuation-in-part of our application Serial No. 135,612, filed September 1, 1961, now abandoned.

This invention relates to oxygen refining of iron.

It is well known to refine molten iron with oxygen of relatively high concentration. The metal may be refined partially or completely to steel from unrefined iron or from partly refined iron.

The first product of reaction between oxygen and carbon is carbon monoxide. It is known that the combustion of 1 kilogram of carbon to carbon monoxide generates 2540 kilocalories of heat, whereas the combustion of 1 kilogram of carbon to carbon dioxide generates as much as 7830 kilocalories of heat. More heat is therefore generated by the after-combustion of carbon monoxide to carbon dioxide than by the combustion of carbon to carbon monoxide.

According to commonly accepted concepts of iron refining, the temperature of slag on a bath of molten metal being refined has to be higher than the temperature of the metal in the bath. The generation of additional heat by the after-combustion of carbon monoxide to carbon dioxide above the metal bath has been exploited widely in steelmaking and other iron refining processes in order to raise the slag temperature to a higher level than the metal temperature. The temperature of the refractory lining of the furnace or vessel in which refining is carried out, is higher than the temperature of the slag and the metal so that heat flows from the space above the metal bath through the slag to the metal.

In the early stages of the development of oxygen refining of iron, it was proposed to project from a nozzle spaced above the surface of a metal bath to be refined, an oxidizing fluid into the metal with a velocity such that a sufficient proportion of the fluid enters the metal there to react with and remove oxidizable impurities in the metal and, in order to increase scrap consumption, provision was made for carbon monoxide evolved from the bath to be burnt to carbon dioxide above the bath either with preheated air or with part of the oxygen stream. The angle and velocity of injection of the oxygen was made adjustable to cause deflection of part of the oxygen from the bath surface. Due to the after-combustion of carbon monoxide to carbon dioxide above the bath, the temperature above the bath is higher than the temperature of the metal in the bath. This arrangement therefore adhered to the commonly acknowledged concepts of steelmaking, namely, that the slag temperature must be higher than the metal temperature.

In order to increase scrap consumption further, the above proposal further provided for the introduction of carbon and other oxidizable heat giving substances into the molten metal. Since it is an object of oxygen refining to remove carbon and other oxidizable impurities from molten metal, this proposal is unacceptable for practical and economic reasons.

As oxygen steelmaking developed, it became generally accepted in the art that it is detrimental for refining oxygen to penetrate to any appreciable extent into a bath of molten metal under treatment. Penetration of refining oxygen was therefore discarded altogether in favor of so-called "surface blowing" and development led to the L.D. process which was the first technically and commercially successful steelmaking process employing oxygen of relatively high concentration. In the L.D. process temperatures in the order of 2500° C. to 3500° C. are generated in a restricted reaction zone on the surface of a bath of molten metal under treatment commonly referred to as "ignition spot," and the pattern of heat flow conforms with acknowledged concepts in that the slag temperature is higher than the metal temperature.

It is a peculiarity of the L.D. process that on the one hand extremely high temperatures occur in the restricted reaction zone on the surface of the metal and that on the other hand the reaction gas issuing from the vessel has a carbon monoxide content of approximately 80%. Although up to approximately 30% of scrap can be consumed in the L.D. process, it is often desired to consume more. It has long been realized that reaction gas rich in carbon monoxide which issues from the L.D. vessel, is a valuable fuel gas. Several proposals have been made to exploit the chemical heat available in the escaping reaction gas in order to increase scrap consumption, but so far without any conspicuous success.

In order to utilize chemical heat in reaction gas rich in carbon monoxide, other processes were developed in which molten metal is refined with oxygen in a refining vessel and the carbon monoxide evolved is burnt to carbon dioxide above the metal bath within the refining vessel. The after-combustion of carbon monoxide generates high temperatures of the order of 2500° C. to 3500° C. and in line with acknowledged concepts the slag temperature is higher than the metal temperature.

The known processes employing after-combustion of carbon monoxide within the refining vessel all suffer from one or other disadvantage. As the said high temperatures are generated above a bath of molten metal most of the heat generated is reflected from and not absorbed by the bath, with the result that rapid wear of the refractory lining of the refining vessel occurs. Furthermore, iron losses occur due to evaporation.

It was subsequently suggested to use two interconnected vessels similar in shape to open hearth furnaces, refining molten metal in the one vessel by blowing refining oxygen onto the surface of the molten metal from a plurality of vertical lances spaced a considerable distance from the metal surface, withdrawing reaction gas from the refining vessel in a direction transversely to the flow of the oxygen streams and burning the reaction gas in the other furnace to melt input material contained therein.

This proposal suffers from the disadvantages that the refractory material of the refining furnace is exposed to the full radiation of the extremely high temperatures of several ignition spots on the surface of the metal, and that interactions between the reaction gases and the vertical oxygen streams during transverse withdrawal of the reaction gases, are unavoidable resulting in partial combustion of carbon monoxide to carbon dioxide. The heat input into the preheating furnace, as represented by the calorific value of the reaction gas issuing from the refining furnace, will fluctuate with variations in the gas flow pattern in the refining furnace. In accordance with acknowledged concepts the slag temperature is higher than the metal temperature.

In another embodiment of this proposal, two interconnected rotary kilns are used instead of two interconnected open hearth-type furnaces. Furthermore, in the refining kiln oxygen is introduced from one end of that kiln at a low angle onto the surface of the molten metal to be refined. It is known that where oxygen is blown at a low angle onto the surface of molten metal, oxygen is deflected from the metal surface and that 40% to 50% of the carbon monoxide evolved from the molten metal is burnt to carbon dioxide above the metal bath.

This after-combustion of carbon monoxide above the metal generates high temperatures which overheat the lining and reduce its life and also raise the slag temperature above the metal temperature. Furthermore, the calorific value of the reaction gas issuing into the preheating kiln will be relatively low.

As far as is known, the above-mentioned proposals of two interconnected vessels have not yet been reduced to practice.

It is an object of the present invention to provide a process for the oxygen refining of iron in which the slag temperature is lower than the metal temperature and heat flows from the molten metal under treatment to the slag and the space above the metal bath.

It is a further object of the present invention to exploit fully combustion heat of carbon available in the iron to be refined.

It is another object of the invention to decrease refractory consumption and to increase the amount of scrap and/or ore which can be consumed.

It is still another object of the invention to provide an iron refining process in which metallurgical control is relatively simple and the ratio between blowing time and auxiliary time is favorable.

According to the invention the process of refining iron comprises injecting a stream of refining oxygen into a bath of molten metal under treatment at an acute angle to the metal surface from a lance having a nozzle at a position in close proximity to the metal surface and at a velocity causing oxygen to penetrate deeply into the bath, controlling the velocity of the stream, the spacing of the lance nozzle relative to the molten metal surface and the angle of the stream relative to the surface of the bath to avoid reflection of oxygen from the surface of the bath into the space above the bath and to avoid entrainment of carbon monoxide from above the bath into the stream of oxygen whereby the oxygen is consumed by reactions within the bath, and the temperature of the bath of molten metal is maintained above the temperature of slag on the bath.

Further according to the invention, the method of refining iron comprises operating a pair of interconnected reactors in alternate phases of treating a bath of molten metal to be refined with oxygen in the one reactor while preheating input material in the other reactor, injecting a stream of refining oxygen into a bath of molten metal under treatment at an acute angle to the metal surface from a lance having a nozzle at a position in close proximity to the metal surface and at a velocity causing oxygen to penetrate deeply into the bath, controlling the velocity of the stream, the spacing of the lance nozzle relative to the molten metal surface and the angle of the stream relative to the surface of the bath to avoid reflection of oxygen from the surface of the bath into the space above the bath and to avoid entrainment of carbon monoxide from above the bath into the stream of oxygen whereby the oxygen is consumed by reactions within the bath, and the temperature of the bath of molten metal is maintained above the temperature of slag on the bath, passing hot carbon monoxide gas evolved from the metal bath out of the refining reactor into the preheating reactor, burning hot carbon monoxide gas issuing from the refining reactor with a medium containing free oxygen in the preheating reactor, and utilizing sensible heat in the carbon monoxide gas issuing from the refining reactor and heat developed by combustion of the carbon monoxide gas in the preheating reactor to preheat input material in the preheating reactor.

Preferred embodiments of the invention will now be described by way of example, with reference to the accompanying drawings, in which.

Figure 1:
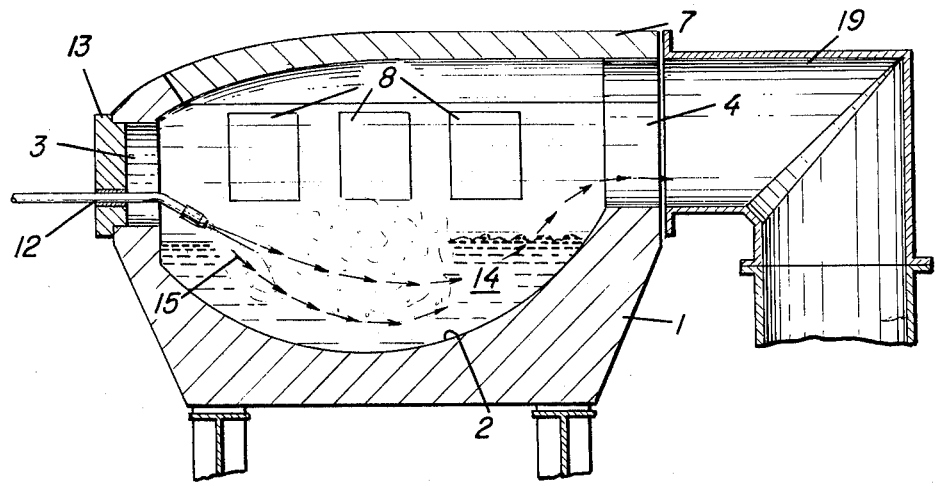
FIGURE 1 is a vertical longitudinal section through a reactor for carrying out the process according to the invention.
Figure 2:
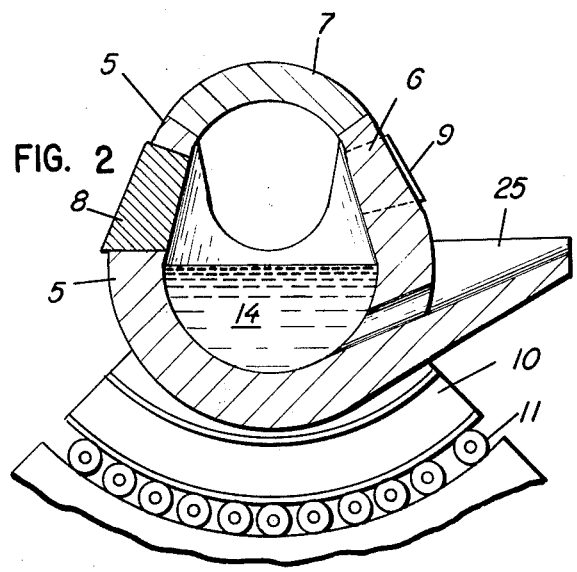
FIGURE 2 is a vertical cross section through the reactor of FIGURE 1.
Figure 3:
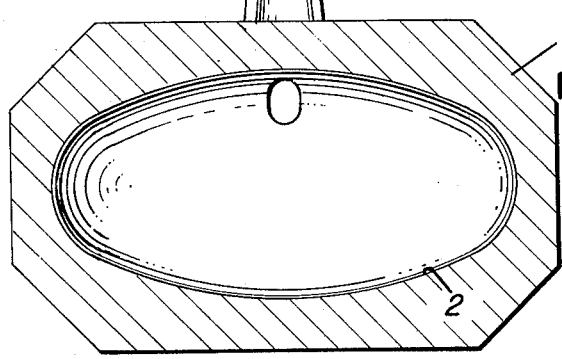
FIGURE 3 is a horizontal section through the hearth of the reactor of FIGURES 1 and 2.

Referring to FIGURES 1, 2 and 3 the reactor comprises hearth 1 with metal-holding surface 2 which is elliptical in shape in horizontal section. In longitudinal vertical section hearth surface 2 has the outline of a segment of an ellipse whereas in vertical cross section it has the outline of a segment of a circle. Hearth 1 is deep and its greatest depth is located at the intersection of the vertical centerlines in vertical longitudinal section and vertical cross section.

The reactor further comprises tapping launder 25, end openings 3, 4, inwardly sloping side walls 5, 6 and removable roof 7. To facilitate removal, roof 7 may comprise a plurality of individually removable panels.

Side wall 5 is provided with charging doors 8 and side wall 6 is provided with a maintenance door 9 on each side of tapping launder 25. End opening 4 communicates with gas extraction header 19.

For tapping purposes, the reactor is mounted on a tilting mechanism comprising track 10 supported on rollers 11.

As can be seen from FIGURE 1, lance 12 for injecting refining oxygen into a bath of molten metal 14 in hearth 1, passes through end opening 3 into the reactor. Lance 12 also passes through end shield 13 which shuts off end opening 3 of the reactor.

In use, a stream of refining oxygen 15 is ejected from lance 12 into metal bath 14 and a slag (not shown) is formed on the molten metal. As shown in the drawings, the refining oxygen is directed only downwardly and in the general direction of the length of the vessel, i.e., towards the opposite end where the port 4 is located. The formation of the slag will be clear to a man skilled in the art. Oxygen 15 is injected at an acute angle to the surface 16 of the molten metal from a position in close proximity to the metal surface 16 at such a high velocity that the oxygen penetrates deeply into metal bath 14. Metal surface 16 is at the slag-metal interface.

The velocity and the direction of the oxygen stream 15 and the shape and depth of metal bath 14 is related to permit the oxygen stream 15 to be dispersed finely within the bath without striking surface 2 of hearth 1.

The refining oxygen entering into metal bath 14 reacts with oxidizable impurities in the molten metal and carbon in the molten metal burns to carbon monoxide which escapes from metal bath 14 into the space above the bath. The reaction gas passes from the reactor through header 19.

Oxygen stream 15 is injected at high velocity from the tip or nozzle of a lance positioned in close proximity to the metal surface and at an acute angle to the metal surface to penetrate deeply into metal bath 14. Actually, control is effected of the velocity of the stream and its direction lengthwise of the vessel which inherently induces a flow pattern in the molten metal, the spacing of the lance nozzle relative to the molten metal surface and the angle of the stream relative to the surface of the bath to avoid reflection of oxygen from the surface of the bath into the space above the bath and to avoid entrainment of carbon monoxide from above the bath into the stream of oxygen whereby the oxygen is consumed by reactions within the bath, and the temperature of the bath of molten metal is maintained above the temperature of slag on the bath. As a result, reaction above metal bath 14 between refining oxygen and carbon monoxide evolved from bath 114 is avoided and very little, if any, carbon dioxide is formed above bath 14. The gas issuing from the reactor comprises essentially carbon monoxide. The sensible and/or chemical heat available in the gas issuing from the reactor may be utilized in any suitable manner.

Since the refining oxygen reacts with oxidizable impurities within metal bath 14 and after-combustion of carbon monoxide above the bath is avoided, the temperature of the molten metal is raised above the temperature of slag on metal bath 14. The temperature above the metal bath 14 remains lower than the tapping temperature of the steel.

In a 120 ton refining reactor operated according to the principles of the present invention, the temperatures of the slag and the molten metal were measured with an immersion pyrometer just before tapping in a number of heats and the following results were obtained:

| Heat | Metal Temperature, ° C. | Slag Temperature, ° C. | Temperature Difference, ° C. |
| --- | --- | --- | --- |
| 1 | 1,586 | 1,535 | 51 |
| 2 | 1,596 | 1,550 | 46 |
| 3 | 1,590 | 1,520 | 70 |
| 4 | 1,600 | 1,546 | 54 |
| 5 | 1,605 | 1,580 | 25 |
| 6 | 1,615 | 1,555 | 60 |
| 7 | 1,595 | 1,560 | 35 |
| 8 | 1,611 | 1,560 | 51 |
| 9 | 1,595 | 1,535 | 60 |
| 10 | 1,596 | 1,525 | 71 |

It has been found that satisfactory results are obtained if oxygen stream 15 is injected at an angle of between 30° and 50° to the bath surface and at supersonic velocity. For best results, the nozzle of lance 12 should be as close as possible to the metal surface 16 and may be located at or just above metal surface 16. It is also possible for the nozzle of lance 12 to be located below the surface of metal bath 14 for instance, to a depth of six inches. Satisfactory results have been obtained with injection at an angle of 45° to metal surface 16 from a position between two inches and six inches above the metal surface and with a velocity of at least 1 Mach and up to 2 Mach (1 Mach=speed of sound=approximately 1075 feet per second).

Figure 4:
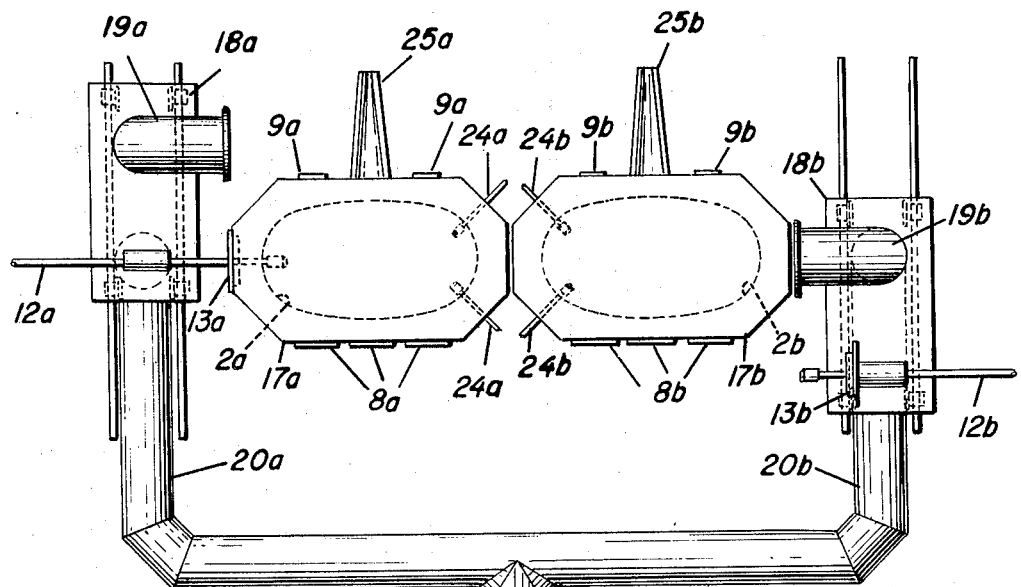
FIGURE 4 is a plan view of an installation incorporating a pair of interconnected reactors similar to that of FIGURES 1, 2 and 3.
Figure 5:
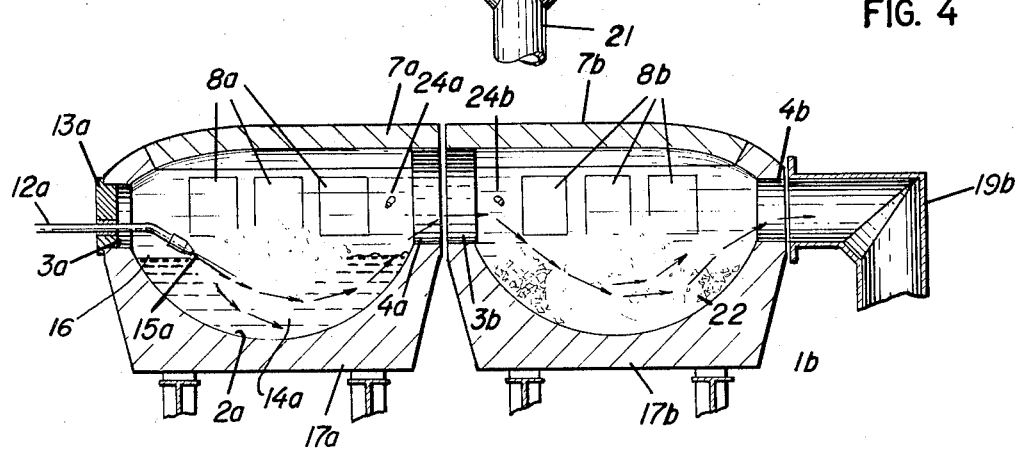
FIGURE 5 is a vertical longitudinal section through the reactors of FIGURE 4.

Referring now to FIGURES 4 and 5, reactors 17a and 17b which are similar to the reactor of FIGURES 1, 2 and 3 are interconnected and arranged to be operated in alternate phases of treating a bath of molten metal to be refined with oxygen in the one reactor in the manner described with reference to FIGURES 1, 2 and 3, while preheating input material in the other reactor thereby to uitlize chemical heat available in the molten metal in two distinct and spatially separate but simultaneous operations.

Reactors 17a and 17b are provided with lance cars 18a and 18b respectively. Lance car 18a mounts waste gas removal hood 19a and lance 12a provided with shield 13a. Lance car 18b mounts waste gas removal hood 19b and lance 12b provided with shield 13b. Waste gas hoods 19a and 19b are connected by waste gas flues 20a and 20b respectively, to common waste gas flue 21.

With lance cars 18a and 18b in the positions shown in FIGURE 4, reactor 17a is used as a refining reactor and reactor 17b is used as a preheating reactor.

In refining reactor 17a a stream of refining oxygen 15a is injected from lance 12a at an acute angle to the surface of molten metal bath 14a and from a position in close proximity to the metal surface at a velocity causing oxygen to penetrate deeply into metal bath 14a. Control is effected of the velocity of the stream, the spacing of the lance nozzle relative to the molten metal surface and the angle of the stream relative to the surface of the bath to avoid reflection of oxygen from the surface of the bath into the space above the bath and to avoid entrainment of carbon monoxide from above the bath into the stream oxygen whereby the oxygen is consumed by reactions within the bath, and the temperature of the bath of molten metal is maintained above the temperature of slag on the bath. Reaction above bath 14a between oxygen and carbon monoxide gas evolved from bath 14a is suppressed, with the results of the process described with reference to FIGURES 1, 2 and 3.

Hot carbon monoxide evolved from metal bath 14a in refining reactor 17a passes from that reactor into preheating reactor 17b into which solid input material 22 has been charged. The input material may comprise scrap and/or iron ore and/or solid pig iron and fluxes.

Sensible as well as chemical heat is available in the hot carbon monoxide gas which passes into preheating reactor 17b. A medium containing free oxygen such as air or oxygen as herein defined is introduced into preheating reactor 17b through auxiliary lances 24b and all or part of the hot carbon monoxide gas issuing from refining reactor 17a is burnt to carbon dioxide in preheating reactor 17b. The sensible heat in the hot carbon monoxide gas issuing from refining reactor 17a and the heat developed by combustion of the hot carbon monoxide gas in the preheating reactor 17b, is utilized to preheat input material 22 in preheating reactor 17b.

Final waste gas passes from reactor 17b through waste gas hood 19b to flues 20b and 21. This final waste gas consists mainly of carbon dioxide.

The conditions for heat transfer from the burning carbon monoxide gas to the input material 22 in preheating reactor 17b is favorable for the following reasons: (1) the hot carbon monoxide gas burns with an extremely hot flame and a large temperature difference exists between the flame and input material 22; (2) the carbon monoxide gas issuing from refining reactor 17a contains dust particles so that the flame is luminous; (3) the shape and direction of the flame can be varied by adjusting the position and configuration of the nozzles through which the medium containing free oxygen is injected into preheating reactor 17b. Preferably, the flame is directed downwardly onto input material 22.

Input material 22 in preheating reactor 17b is preheated. Just before refining of metal bath 14a in refining reactor 17a is completed, a charge of hot metal is introduced into preheating reactor 17b. As soon as refining in reactor 17a is complete, the refined metal is tapped through launder 25a by tilting the reactor 17a. While tapping proceeds, lance 12a is retracted from reactor 17a and the positions of lance cars 18a and 18b are reversed to bring waste gas hood 19a into alignment with opening 3a of reactor 17a and to bring shield 13b into alignment with opening 4b of reactor 17b to permit insertion of lance 12b into reactor 17b. The phase of operations is now reversed by blowing refining oxygen through lance 12b into the molten metal in reactor 17b in order to refine the metal, and charging and preheating input material in reactor 17a. Reaction gas from refining reactor 17b is burnt in preheating reactor 17a by introducing a medium containing free oxygen through auxiliary lances 24a. Final waste gas consisting mainly of carbon dioxide passes from reactor 17a through waste gas hood 19a to flues 20a and 21.

Metal is refined alternately in reactors 17a and 17b and oxygen blowing is interrupted only during the changeover of the positions of lance cars 18a and 18b. Input material can be charged into the preheating reactor through its charging doors 8a or 8b as the case may be without interrupting oxygen blowing in the refining reactor. Temperature measurement and sampling can also be effected through charging doors 8a or 8b of the refining reactor without interrupting oxygen blowing. As a result the unproductive time in short.

The amount of scrap and/or iron ore which can consistently be changed into the preheating reactor without any extraneous fuel being required in either reactor, is determined by the heat balance of the process as a whole. It has been calculated that 40% to 45% of scrap can be consumed without extraneous fuel being used, the scrap being preheated to a temperature of about 900° C. before hot metal is charged into the preheating reactor.

It will be appreciated that if no extraneous fuel is used in either reactor, the heat balance of the process as a whole imposes a limitation on the amount of scrap that can be consumed and the temperature to which input material can be preheated. If these limits are exceeded, extraneous fuel will be required to supplement chemical heat available in molten metal under treatment.

It has been found quite unexpectedly that the refining method according to the invention in which the metal temperature is higher than the slag temperature, yields steel of the same quality as conventional steelmaking processes in which the metal temperature is lower than the slag temperature. Since after-combustion of carbon monoxide gas above the molten metal bath in the refining reactor is suppressed, lining temperatures are low and lining life long.

The detrimental effects of the high flame temperature experienced in known processes in which hot carbon monoxide is burnt with oxygen above a bath of hot molten metal, are avoided in the preheating reactor of the present invention since the heat of the carbon monoxide gas flame is absorbed rapidly by cold input material in the preheating reactor.

The process according to the invention is suitable for use with low phosphorus as well as high phosphorus iron.

Having described our invention, we claim:

1. In the operation of a tandem furnace for the production of steel, said furnace comprising two elongated refractory vessels with a connecting passage adjacent one end only thereof for the transfer of gases from one vessel to the other vessel and wherein each vessel is alternately used as a refining furnace while the other is then used as an input material preheating furnace, and wherein the vessel functioning on its metal refining cycle contains a molten charge of ferrous metal with a carbon content higher than the desired carbon content of the finished steel, said molten charge having an overlying slag layer, and the vessel which is then on its input preheating cycle contains an input material charge of scrap to be preheated, the method which comprises:

(a) injecting a high velocity jet of refining oxygen from a lance into the vessel containing the molten metal only at the end of said vessel remote from the connecting passage and only in a direction which is downward at an acute angle to the surface of the metal and toward the end of the vessel at which the connecting passage is located and thereby generate heat in the metal by the reaction of carbon and oxygen and release CO into the vessel above the metal, (b) maintaining the temperature of the CO in the space above the slag at a temperature no higher than the temperature of the molten metal by the exclusion of oxygen from contact therewith in an amount sufficient to raise the temperature of the furnace gases to a level where the slag temperature may be higher than the temperature of the molten metal by controlling the velocity of the oxygen stream in the range between 1 and 2 Machs, the spacing of the oxygen lance with respect to the metal to minimize entrainment of the CO in the vessel into the oxygen stream and by adjusting the angle of the jet to avoid reflection of the oxygen from the surface of the metal, (c) conducting the CO from the refining vessel through said connecting passage into the preheating furnace and burning the CO with oxygen in the preheating furnace to thereby preheat the scrap.

2. The method defined in claim 1 in which the jet of oxygen is directed into the molten metal at an angle between about 30° and about 50° relative to the surface of the metal and wherein the nozzle is positioned not more than six inches above the level of the metal and no more than six inches below said level.

3. The method defined in claim 1 in which the injection of oxygen is effected by directing the jet of refining oxygen into the molten metal wherein the acute angle is between 30° and 50° to the surface of the metal and the end of the lance is positioned not more than six inches above the level of the metal and not more than six inches below said level, and wherein each of the vessels is generally elliptical in longitudinal section and the bottom of which is generally semi-circular in transverse section and the lance has its discharge terminal positioned closely adjacent the end of the furnace in which it is located.

4. The method defined in claim 1 in which the combustion of CO in the preheating vessel is controlled by the regulated admission of oxygen to heat the scrap and maintain the temperature thereof at about 900° C.

5. The method defined in claim 1 in which the combustion of CO in the preheating vessel is controlled by the regulated admission of oxygen to heat the scrap and maintain the temperature thereof at a controlled level below the melting temperature of the input material.

References Cited by the Examiner

UNITED STATES PATENTS

| | | | |
|---|---|---|---|
| 2,644,746 | 7/1953 | Hauttmann | 75—60 |
| 2,818,247 | 12/1957 | Francis. | |
| 2,839,382 | 6/1958 | Graef | 75—60 |
| 2,893,861 | 7/1959 | Rinesch | 75—52 |
| 3,060,014 | 10/1962 | Aihara | 75—60 |

FOREIGN PATENTS 642,084   8/1950   Great Britain.

DAVID L. RECK, *Primary Examiner.*

BENJAMIN HENKIN, *Examiner.*

R. O. DEAN, *Assistant Examiner.*